3,505,284
CATALYSTS FOR EPOXY RESINS THICKENED
WITH ISOCYANATES
Albert J. Dalhuisen, San. Jose, Calif., assignor to Merck
& Co., Inc., Rahway, N.J., a corporation of New
Jersey
No Drawing. Continuation-in-part of application Ser. No.
638,602, May 15, 1967. This application June 13, 1967,
Ser. No. 645,631
Int. Cl. C08g 30/04
U.S. Cl. 260—47                              12 Claims

ABSTRACT OF THE DISCLOSURE

MgO; Mg(OH)$_2$; magnesium basic carbonate and the above magnesium compounds pretreated with isocyanates as catalysts for the chemical thickening reaction involving hydroxyl containing epoxy resins which contain carboxylic acid anhydride hardening agents and di- and polyisocyanates.

CROSS REFERENCES TO RELATED APPLICATION

This application is a continuation-in-part of copending application Ser. No. 638,602, filed May 15, 1967.

SUMMARY

This invention is concerned with a novel composition of matter comprising hydroxy containing epoxy resins. More particularly, it is concerned with a composition of matter comprising an hydroxyl containing epoxy polymer or monomer, carboxylic acid anhydride hardening agents therefor, an isocyanate as a chemical thickening agent for the epoxy materials and a catalytic agent for the thickening reaction.

Epoxy resins are generally commercially available materials which find use in various applications. To mention a few, they are used in surface coatings, pipe parts, for casting tools and dies and for encapsulation of electrical parts. During the preparation of such articles, it has been found desirable to impart additional physical properties to the epoxy resin used so as to permit efficient and technically superior production techniques. The use of an epoxy-isocyanate composition which rapidly increases in viscosity is an important factor in permitting the desired production techniques. The more rapid increase of viscosity permits the resulting thickened epoxy to be used sooner after mixing and thereby reduces the amount of material held in inventory; this affords production economies.

We have proposed in our U.S. patent application Ser. No. 638,602, of which this application is a continuation-in-part, to provide isocyanates which when combined with an epoxy resin-anhydride hardener formulation cause a surprisingly rapid viscosity increase in the composition obtained. This is achieved in a manner so that the thickened product is neither hard nor gelled but possesses an increased viscosity resulting in improved handling and processing of the heat curable resin mixture especially prior to and during curing. The thickened material can be kept at room temperature for a period of at least 1 day without a significant change in viscosity or the forming of a gel. The thickened product can be cured by heating or by microwaves.

This invention has for its object the catalysis of the chemical thickening reaction indicated above. The catalytic materials which find use in this invention are MgO, Mg(OH)$_2$, magnesium basic carbonate and, where the above magnesium compounds have been pretreated with an isocyanate material.

The chemically thickened and thermoplastic properties of the catalyzed thickened product and its stability at room temperature make it suitable for producing the thickened material into sheet form. The sheet is soft and pliable and can be cut easily to the size and shape which is most suitable and most economic for use in the mold in which the material is to be ultimately cured. Scraps left after cutting can again be worked into sheet material, thus making it possible to reduce material losses.

If the material has been applied to—and thickened on—a cloth, then this can be cut to the desired shape and size to fit the mold.

If fillers, reinforcing agents, or cloth are used, then this thickened catalyzed resin provides superior hiding of these materials. In this manner, the surface of the cured product shows little or no presence of these materials.

The properties of the thickened product of the present invention are such that during the heat curing, good flow is achieved in the mold. In this manner the mold is filled properly and the cured product shows great performance uniformity for many different sizes and shapes of cured product.

Further objects will become apparent from the following description of the invention.

The hydroxyl containing epoxy resins useful as starting materials in the present invention are normally derived from epichlorohydrin, or similar materials and di- or polyhydroxy phenols, or di- and polyhydric alcohols. The resins would also include aliphatic epoxy resins based on polyglycols and hydroxyl containing flame retardant resins containing halogen or phosphorous. It is intended that the terms di- and polyhydroxy phenols include the mononuclear as well as the polynuclear phenols. The term dihydric alcohols is intended to include glycols, i.e. compounds containing two hydroxy groups such as ethylene glycol and polyhydroxy compounds such as glycerine and the like. A commonly used epoxy resin is prepared from p,p'-isopropylidenediphenol (bisphenol A) and epichlorohydrin. As illustrative of the epoxy resin which may be used in accordance with the invention, there may be mentioned Epotuf 37–140, a composition prepared from epichlorohydrin and bisphenol A. This epoxy polymer has an oxirane equivalent of 185–200 and is manufactured and sold by Reichhold Chemicals, Inc. Epon 828 manufactured by Shell Chemical Co. is another epoxy polymer of similar type.

One or more epoxy monomers may be present in the system. However, there must be at least one type of epoxy monomer in the system which contains at least one hydroxyl group attached to the epoxy molecule.

The anhydride hardeners useful in curing these resins are well known and include agents such a phthalic anhydride, maleic, succinic, tetrahydrophthalic anhydride, hexahydrophthalic anhydride, dodecenylsuccinic anhydride, Nadic Methyl Anhydride, and the like. The novel compositions may also contain other constituents such as fillers, diluents, reactive or unreactive solvents, etc. Virtually any type of anhydride may be employed, including halogenated derivatives. It is common in the art to use a mixture of anhydrides. The type and amount of anhydride(s) and epoxy resin(s) is such that when thickened with isocyanate the resin should not be too hard or gelled. Normally, the equivalent ratio of epoxy to anhydride ranges from about 1:1 to 1:085, however, anhydride amounts as low as a ratio of 1:0.5 can be used, depending on processing conditions, type of catalyst, and desired properties.

The novel compositions of the invention may also contain other constituents that are conventionally employed in epoxy resin formulations such as diluents, solvents, fillers, reinforcing agents, coupling agents, UV stabilizers, surfactants or pigments, etc.

It has been previously determined that desirable chemical thickening of an epoxy-anhydride formulation can be achieved by aromatic or aliphatic isocyanates having at least two reactive isocyanate groups per molecule. Examples of isocyanates that may be employed include 1,6-hexanediisocyanate; lysine diisocyanate methyl ester; tolylene-2,4-diisocyanate; methylcyclohexylene diisocyanate; diphenylmethane diisocyanate; 3,3'-dimethyl-4,4'-biphenylene diisocyanate; Niax Tolylene Diisocyanate, a commercial mixture of diisocyanate isomers manufactured by Union Carbide Co. which contains 80% of the 2,4-isomer and 20% of the 2,6-isomer; polymethylene polyphenylisocyanate, a polymeric isocyanate produced by the Upjohn Co. and sold under the trade name PAPI. The particular isocyanate is not critical, any aromatic or aliphatic isocyanate having at least two reactive isocyanates would produce the desired effect. The amount of isocyanate employed is that amount which produces the desired degree of thickening. However, it is desirable that the amount be such as to completely react with substantially all moisture and all hydroxyl present in the mixture with little excess isocyanate remaining. The amount employed shall usually vary within the range 2–40 parts per hundred parts of epoxy resin or monomer (phr.), the preferred range being about 5–20 phr. For reasons explained below the amount of isocyanate should be sufficient to react with the moisture content of the system, apart from the isocyanate required for the actual thickening, whereby, 2 isocyanate groups are required for every $H_2O$ molecule.

It is believed that the surprising viscosity increase in the epoxy resin to be due to a reaction between the dior polyisocyanate and the hydroxyl groups of the epoxy molecules. In this manner, chains are formed in which epoxy molecules are joined through a reaction with the isocyanate This reaction is believed to be responsible for the production of the highly viscous essentially thermoplastic material.

Initial experiments involving the use of isocyanates as chemical thickeners for epoxy resin-anhydride hardener systems presented problems since the isocyanates tend to react with $H_2O$ to form $CO_2$. If the $CO_2$ gas is liberated during a high viscosity stage, it would be extremely difficult for it to escape from the resin, resulting in voids in the cured plastic. This undesirable $CO_2$ formation at a high viscosity stage was eliminated by providing for a reaction sequence whereby the isocyanate reacts first with all available moisture before a large viscosity increase starts or before gelling occurs. This was achieved by choosing a temperature range in which the isocyanate reacts relatively quickly with water but more slowly with the hydroxyl of the epoxy. The next stage in the reaction involves the reaction of the isocyanate with the hydroxyl groups of the epoxy molecules. Isocyanates having at least 2 reactive isocyanate groups per molecule are required for the thickening reaction. These isocyanates shall also react with the moisture in the system. However, a monoisocyanate may be included in the system for the reaction with the moisture. By choosing a monoisocyanate which is considerably more reactive with water than the di- or polyisocyante which is used for thickening, the reaction with the moisture occurs more readily before a high viscosity stage is achieved. The proper reaction sequence is obtained, if only one isocyanate is used for thickening as well as the reaction with moisture, by choosing such a temperature that the reaction with water proceeds rapidly while the thickening reaction proceeds slowly. One may also employ a monoisocyanate in an amount sufficient to react with all moisture present in the mixture. After the mixture is heated and mixed and all the water has reacted with the monoisocyanate, the di- or polyisocyanate used to produce the thickening exect is introduced and the mixing and heating continued until the desired degree of thickening is obtained. An example of a monoisocyanate that may be employed to reduce the moisture content of the system is phenyl isocyanate.

It is desirable that following the isocyanate-epoxy reaction, there should not be significant excess isocyanate remaining since it has been observed that excess isocyanate has a tendency to affect the final epoxy curing resulting in void formation during gelling. The purpose of the catalysts of the present invention is to catalyze the isocyanate-water and the isocyanate-hydroxyl reactions without catalyzing the epoxy-anyhydride reaction to any great extent. The discovery that the catalysts of the present invention have practically no catalytic activity at room temperature as far as the epoxy-anhydride cure is concerned provides the art with chemical thickened epoxy resins which may be kept at room temperature prior to final curing. This is a decided advantage when compared with prior art catalytic agents such as tertiary amines and organo metallo compounds whose reactions do not proceed in the proper sequence and accordingly, do not result in thickened materials which do not gel when maintained at room temperature. The catalysts of the present invention possess additional desirable properties. For example $Mg(OH)_2$ has been found to be highly effective as a catalytic agent and particularly desirable in those instances when a cured transparent epoxy material is indicated. Magnesium basic carbonate catalyst may be employed, without requiring special precautions, in those systems where moisture or $CO_2$ in the air would otherwise create problems of catalyst stability. Apart from using the catalysts in their unmodified form, MgO and $Mg(OH)_2$ and Mg basic carbonate can also be used by pretreating these compounds with isocyanates. In addition to pretreating the magnesium compounds with the isocyanates that are employed in the chemical thickening reaction it is possible to use other isocyanate materials for this purpose. Isocyanates which find use in the pretreatment other than those which participate in the thickening reaction include monoisocyanates such as phenylisocyanate. The pretreatment is advantageous in reducing the amount of moisture in the magnesium material and thus avoiding the possibility of the excess moisture in the magnesium catalytic material reacting with the isocyanate which may result in an undesirable prolonged evolution of $CO_2$ in the system.

The novel composition of matter according to the present invention may be prepared by mixing or blending together the catalyst, epoxy, anhydride hardener and isocyanate. The mixing or blending can be achieved by any conventional method known to the art. Vigorous mixing is not required. Any heating system which will not cause localized hot spots may be employed for catalyzing the reaction between the isocyanate and water and the isocyanate and hydroxyl containing epoxy. All ingredients are mixed or blended together, then they are heated and mixed at such a temperature that materials of the invention catalyze the isocyanate reaction with the moisture and hydroxyl, however avoiding catalyzing the reaction between the epoxy resin-anhydride hardener; the objective being to achieve chemical thickening without curing the system. The temperature at which catalytic thickening is achieved separately from the prior to final curing occurs ranges from about 50° C. to about 200° C. A preferred temperature range is from about 85° C. to 135° C. The duration of the heating is such to preclude final curing although effecting chemical thickening. Generally, heating from about 20 minutes to about 6 hours at 125° C. shall produce the desired thickening effect. The heating may be continued until all isocyanate has reacted or the heat may be discontinued after a portion of the isocyanate has reacted. In the latter case the resin formulation will require a second heat treatment or aging at room temperature in order to reach the final viscosity at which stage little or no reactive isocyanate should remain. For example, when the resin is to be applied to a cloth, it is advantageous to apply the mixture to the cloth before the final viscosity is reached since that shall result in good wetting of the cloth by the resin mixture. A further and final thickening of the resin mixture may then be obtained by the application of heat, aging at room temperature or by the application of microwaves. Final curing of the resin mixture is achieved in the normal manner by heating.

The method of incorporation and order of addition of the components can be varied without significantly affecting the reaction. For example, it is possible to add the isocyanate to a preheated and premixed mixture of the epoxy resin and hardener or the isocyanate can be added to the cold mixture and heat applied.

The amount of catalytic agent to be employed per hundred parts of epoxy resin shall usually vary within the range of 0.1 to 15 for the MgO, $Mg(OH)_2$ and Mg basic carbonate, the preferred range being 0.5 to 5 per hundred parts of resin. For the isocyanate pretreated magnesium the ranges are also 0.1 to 15 phr. being based on the magnesium compound content of the pretreated material. Although the range of catalytic agent is not critical, the conditions of the system, however, must be such that the proper reaction sequence is obtained; namely, to have substantially all moisture reacted before the hydroxyl has reacted and to have essentially all isocyanate reacted before the epoxy and anhydride gels.

In order to demonstrate the catalytic effect of the materials of the present invention when combined with di- and polyisocyanate thickening agents for epoxy resins, the following experiments were performed. The catalytic agents employed in the following examples are Maglite D3231, Marinco H1211 and Magcarb L2341. These represent grades of magnesium oxide, magnesium hydroxide and magnesium basic carbonate, respectively, and are manufactured and sold by Merck & Company, Inc. The particular form of the magnesium containing product employed in the present invention is not critical and any commercially available product can be effectively utilized. It should be noted, however, that the following examples are given for the purpose of illustration and not by way of limitation.

EXAMPLES

To the epoxy resin (Epon 828) prepared from epichlorohydrin and bisphenol A and manufactured and sold by Shell Chemical Co. is added Nadic Methyl Anhydride, a liquid organic anhydride manufactured and sold by Allied Chemical Corp. The mixture of catalytic agent, epoxy resin and anhydride hardener is blended together and heated until the temperature at which the resin is to be thickened is reached. At this temperature the isocyanate is added. The isocyanate employed in this particular example is polymethylene polyphenylisocyanate manufactured and sold under the trade name PAPI by the Upjohn Company. During the thickening the temperature is kept to within ±2° C. of the reported temperature and the mixing continued during the thickening process. The epoxide to anhydride equivalent ratio used in these experiments is 1:1. The compositions, both with and without the isocyanate were prepared in the identical manner.

The viscosity was measured with a Gardner Bubble Viscometer, Series U–Z6. This instrument measures the speed of an air bubble traveling upward through a tube filled with the sample. Numbers and letters are used for viscosity values; a higher letter or number indicates a higher viscosity. The highest viscosity obtained is designated as "no flow" which indicated that no flow occurred in the viscosity tube within 60 minutes after turning the tube. The viscometer was maintained at 25° C., whereas the samples were measured when at 25° C. and in some cases 100° C.

Gel time was tested by probing the cured resin with a spatula. Gel times of the thickened mixtures were determined as an indication of the speed of the epoxy-anhydride curing reaction.

The following results were obtained.

EXAMPLE I

Epon 828—200 gms.
Nadic Methyl Anhydride—180 gms.
PAPI—12.5 gms.
Thickening reaction temperature—175° C.
Gardner viscosity at 25° C.:
    After 30 minutes heating—Z–5
    After 1 hour heating—Z–6
    After 2 hours heating—>Z–6
    After 3 hours heating—>Z–6
    After 4 hours heating—>Z–6
    After 6 hours heating—No flow
Gardner viscosity at 100° C.:
    After 4 hours heating—<U
    After 6 hours heating—Z–1
Gel time at 175° C. after heating 6 hours at 175° C.—5 hours

EXAMPLE II

Epon 828—200 gms.
Nadic Methyl Anhydride—180 gms.
MgO—8 gms.
PAPI—12.5 gms.
Thickening reaction temperature—135° C.
GGardner viscosity at 25° C.:
    After 30 minutes heating—>Z–6
    After 1 hour heating—No flow
Gel time at 175° C. after heating 1 hour at 135° C.—16 minutes The substantial acceleration of both the thickening reaction and gelling reaction displayed by the formulation of Example II containing the MgO catalytic agent is clearly evident when compared with the same preparation without the MgO (Example I). It should be further noted that in addition to the substantial viscosity increase, the thickened product demonstrates excellent stability at room temperature. For example, the thickened sample with a viscosity of Z–6 at 25° C. did not show a change in viscosity when maintained for 2 days at room temperature.

EXAMPLE III

Epon 828—200 gms.
Nadic Methyl Anhydride—180 gms.
Magnesium basic carbonate—7.5 gms.
PAPI—12.5 gms.
Thickening reaction temperature—175° C.
Gardner viscosity at 25° C.:
    After 30 minutes heating—>Z–6
    After 1 hour heating—>Z–6
Gel time at 175° C., after heating 1 hour at 175° C.—105 minutes

EXAMPLE IV

Epon 828—200 gms.
Nadic Methyl Anhydride—180 gms.
Magnesium hydroxide—7.5 gms.
PAPI—12.5 gms.
Thickening reaction temperature—175° C.
Gardner viscosity at 25° C. after 15 minutes heating—>Z–6
Gel time at 175° C., after heating 15 minutes at 175° C.—20 minutes Examples III and IV demonstrate that the addition to the system of magnesium basic carbonate and magnesium hydroxide results in accelerated thickening and gelling reactions. It should be further noted that a clear product is produced upon curing the formulation containing $Mg(OH)_2$.

EXAMPLE V

Epon 828—200 gms.
Nadic Methyl Anhydride—180 gms.
25% MgO in PAPI [1]—12.5 gms.
Thickening reaction temperature—175° C.
Gardner viscosity at 25° C.:
    After 15 minutes heating—Z–4
    After 30 minutes heating—Z–6
    After 1 hour heating—>Z–6
Gel time at 175° C., after heating for 1 hours at 175° C.— 3 hours

[1] This is MgO pretreated with isocyanates. It was prepared by heating 450 gm.s of PAPI and 150 gms. of MgO for 3 hours at 135° C.

Exemple V shows the accelerating effect upon the thickening and gelling reactions when MgO which is pretreated with isocyanate is employed as the catalytic agent. It was further noted that a MgO pretreated in this manner caused less gas evolution during the thickening reaction, than an untreated MgO. Thus, the addition of catalysts during the preparation of isocyanate thickened epoxy-anhydride formulations makes it possible for the reaction to proceed with shorter reaction times and lower reaction temperatures. The catalysts of the invention not only accelerate the thickening effect but do not have catalytic activity at room temperature and thereby result in a thickened material which possesses room temperature stability.

Similar results are obtained when the catalytic agents of the present invention are combined with other hydroxyl containing epoxy resins, anhydride hardeners and aromatic and aliphatic isocyanate thickeners.

Although this invention has been described with reference to particular embodiments thereof, it is to be understood that the invention is susceptible to other modifications which appear within the spirit of the invention and the scope of the appended claims.

What is claimed is:

1. A process of increasing the viscosity of an hydroxyl containing 1,2-epoxy monomer which comprises heating from about 50° C. to about 200° C. a mixture of said hydroxyl containing epoxy monomer, an anhydride hardener, from about 2 to about 40 parts per hundred parts of monomer of an aliphatic or aromatic isocyanate containing at least two isocyclanate groups and a catalytic agent selected from a group consisting of MgO, Mg(OH)$_2$, magnesium basic carbonate, and MgO, Mg(OH)$_2$ and magnesium basic carbonate pretreated by means of heating from about 3 hours at about 135° C. with an isocyanate, the heating of the mixture of monomer, hardener, catalytic agent and isocyanate being conducted at a time and temperature such as to thicken the epoxy material without producing substantial final curing and the amount of isocyanate is such that substantially no excess of isocyanate remains at the conclusion of the thickening reaction.

2. The process of claim 1 which contains for each 100 parts of epoxy, about 0.1 to 15 parts of catalytic agent and the equivalent ratio of epoxy to anhydride is from about 1:1 to 1:0.5.

3. The process of claim 2 wherein the catalytic agent is MgO.

4. The process of claim 2 wherein the catalytic agent is Mg(OH)$_2$.

5. The process of claim 2 wherein the catalytic agent is magnesium basic carbonate.

6. The process of claim 2 wherein the catalytic agent is MgO, Mg(OH)$_2$ or magnesium basic carbonate pretreated with an isocyanate.

7. A process of increasing the viscosity of an hydroxyl containing 1,2-epoxy resin which comprises heating from about 50° C. to about 200° C. a mixture of said hydroxyl containing epoxy resin polymer, an anhydride hardener, from about 2 to about 40 parts per hundred parts of resin of an aliphatic or aromatic isocyanate containing at least two isocyanate groups and a catalytic agent selected from the group consisting of MgO, Mg(OH)$_2$, magnesium basic carbonate, and MgO, Mg(OH)$_2$ aund magnesium basic carbonate pretreated by means of heating from about 3 hours at about 135° C. with an isocyanate, the heating of the mixture of polymer, hardener, catalytic agent and isocyanate being conducted at a time and temperature such as to thicken the epoxy material without producing substantial final curing and the amount of isocyanate is such that substantially no excess of isocyanate remains at the conclusion of the thickening reaction.

8. The process of claim 7 which contains for each 100 parts of epoxy about 0.1 to 15 parts of catalytic agent and the equivalent ratilo of epoxy to anhydride is from about 1:1 to 1:0.5.

9. The process of claim 8 wherein the catalytic agent is MgO.

10. The process of claim 8 wherein the catalytic agent is Mg(OH)$_2$.

11. The process of claim 8 wherein the catalytic agent is magnesium basic carbonate.

12. The process of claim 8 wherein the catalytic agent is MgO, Mg(OH)$_2$ or magnesium basic carbonate pretreated with an isocyanate.

References Cited

UNITED STATES PATENTS

| | | | |
|---|---|---|---|
| 3,267,077 | 8/1966 | Windemuth et al. | 260—77.5 |
| 3,268,477 | 8/1966 | Mueller | 260—47 |
| 3,316,191 | 4/1967 | Montesano | 260—2 |
| 3,317,480 | 5/1967 | Fetscher et al. | 260—2 |
| 3,404,195 | 10/1968 | Weinrich | 260—47 |

HAROLD D. ANDERSON, Primary Examiner

U.S. Cl. X.R.

260—2, 77.5

UNITED STATES PATENT OFFICE
CERTIFICATE OF CORRECTION

Patent No. 3,505,284     Dated April 7, 1970

Inventor(s) Albert J. Dalhuisen

It is certified that error appears in the above-identified patent and that said Letters Patent are hereby corrected as shown below:

Column 2, line 65, "1:085" should read --1:0.85--
Column 3, line 34, "dior" should read -- di- or --
Column 3, line 38, "isocyanate This" should read
                   --isocyanate. This--
Column 3, line 74, "exect" should read --effect--
Column 6, line 29, "GGardner" should read --Gardner--
Column 7, line 12, "isocyanates" should read --isocyanate--
Column 7, line 13, "gm.s" should read --gms.--
Column 7, line 15, "Exemple" should read --Example--

In the Claims:
Column 7, line 44, "isocyclanate" should read --isocyanate--
Column 7, line 45, "from a group" should read --from the group--
Column 8, line 15, delete the term "polymer"
Column 8, line 31, "ratilo" should read --ratio--

Signed and sealed this 22nd day of September 1970.

(SEAL)
Attest:

Edward M. Fletcher, Jr.
Attesting Officer

WILLIAM E. SCHUYLER, JR.
Commissioner of Patents